C. SHARPS.

Cartridge.

No. 1,455. Reissued Apr. 21, 1863

Witnesses.

Henry Howson

Chas. Howson

Christian Sharps

N. PETERS, PHOTO-LITHOGRAPHER, WASHINGTON, D. C.

UNITED STATES PATENT OFFICE.

CHRISTIAN SHARPS, OF PHILADELPHIA, PENNSYLVANIA.

IMPROVEMENT IN PACKING CARTRIDGES.

*Specification forming part of Letters Patent No.* 29,108, *dated July* 10, 1860; *reissue No.* 1,455, *dated April* 21, 1863.

*To all whom it may concern:*

Be it known that I, CHRISTIAN SHARPS, of the city of Philadelphia and State of Pennsylvania, did obtain Letters Patent of the United States, dated the 10th day of July A. D. 1860, for an Improvement in Packing Cartridges, which Letters Patent I now deem inoperative and invalid by reason of a defective specification; and I do hereby declare the following to be a full, clear, and exact description of my said invention, reference being had to the accompanying drawing, and to the letters of reference marked thereon.

My invention consists in a process of packing the hollow collars of metallic cartridges with detonate by means of a wad of such a form and so applied that while it maintains the detonate in its proper position, it serves as a rigid object for receiving the blow of the hammer, and insures that percussion of the detonate which is necessary for its proper ignition.

In order to enable others skilled in the art to practice my invention, I will now proceed to describe the manner in which I carry it into effect.

Figure 1:
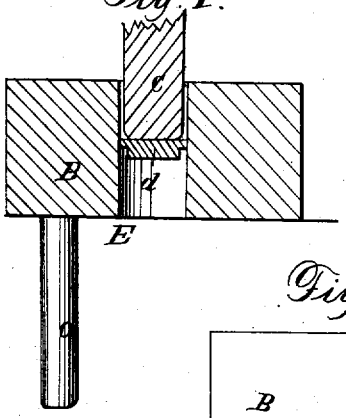
Figure 2:
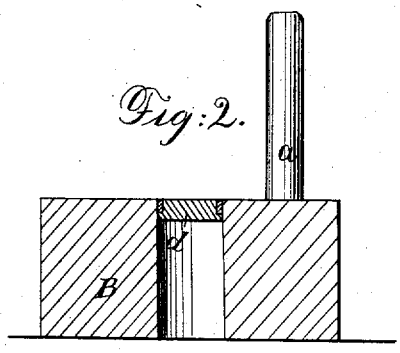
Figure 3:
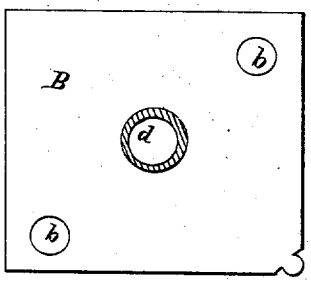
Figure 6:
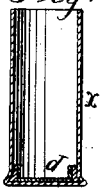
Figure 7:
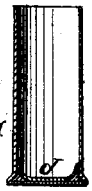
Figure 4:
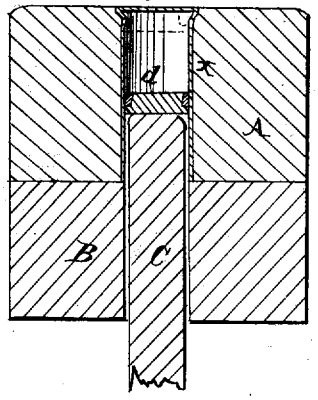
Figure 5:
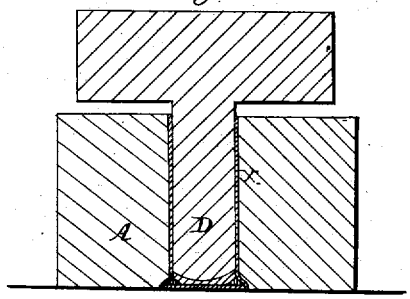

On reference to the accompanying drawing, which forms a part of this specification, Figure 1 represents the first stage in the operation of packing metallic cartridges in accordance with my improvement; Fig. 2, the second stage; Fig. 3, a plan of Fig. 2; Fig. 4, the third step of the packing operation. Fig. 5 illustrates the manner of completing the packing, and Figs. 6 and 7 are views showing a metallic wad for packing the detonate.

The instruments by which I pack the case of the cartridge consist of two metal blocks, A and B, a plunger or ram, C, with a flat end, and a second plunger or ram, D, with a rounded end. The block A is in thickness equal to the length of the metallic cartridge-case *x*, which fits snugly in an orifice in the said block, as seen in Fig. 4. The block B has an orifice of exactly the same diameter as that of the inside of the cartridge-case, and is provided with projecting pins *a a*, adapted to orifices, *b b*, Fig. 3, in the block A, so that the two blocks, after being separated, may always occupy the same position in respect to each other, the orifice of one block being concentric with that of the other.

In the first instance, the block B (removed from the block A) is placed on a level surface, E, Fig. 1, the pins *a* projecting downward. A wad, *d*, of the form illustrated in Figs. 1, 2, and 4, is then inserted in the orifice of the block, and is rammed down by the plunger C until the surface of the said wad touches the surface E, after which the block is turned upside down, as seen in Fig. 2.

It will be observed that there is an annular recess between that portion of the wad which is smallest in diameter and the side of the orifice of the block, and that the depth of the recess is limited by the collar formed on the wad by the portion of the latter which fits tightly into the orifice of the block. Into this annular recess I deposit the detonating-powder by rubbing the latter over the surface of both wad and block until the recess is completely filled, after which all the superfluous powder is removed from the surface of the block and wad. The block A, with its cartridge-case *x*, is now placed over the block B, Fig. 4, the pins of the latter block fitting into the orifices of the former. The two blocks are then applied to the plunger C, which is held stationary while the blocks are depressed, thus causing the plunger C to push the wad *d*, with its annular body of detonate, from the orifice of the block B into the inside of the metallic case, and upward to the end of the same, as seen when the detonate, which has hitherto been confined to the annular space, is in a position to communicate with the interior of the hollow collar formed on the end of the cartridge, and to be packed within the same by the last operation, which is accomplished as follows:

The block A is removed from the block B and placed upside down on a level surface, as seen in Fig. 5. A plunger, D, is now inserted into the cartridge so as to bear with its rounded end on the wad. By either a smart blow or a uniform pressure imparted to the plunger, the rounded end of the latter indents the wad in the middle, and causes it to assume the form represented in Fig. 5, and to pack the detonate tightly into the hollow collar. After this the plunger D is removed, and the cartridge is forced from the recess in the block A, and is now ready for receiving the charge of powder and ball. The wad *d*, as illustrated in the above-described figures, may be made of ordinary pasteboard or other like rigid material. It may, however, be made of thin metal, and of the form shown in Fig. 6, in which case the rounded end of the descending plunger D will cause the wad to assume the form represented in Fig. 7, and to answer precisely the same purposes as the pasteboard, wad as regards the packing of the detonate and confining the same within the hollow collar of the cartridge.

Although I have described a specific mode of introducing the detonate into the hollow collar of the cartridge-case, for the reason that I have found that mode efficient in practice, it should be understood that the detonate may be introduced prior to the forcing in of the wad by means heretofore practiced, the wad retaining the detonate in its position, and, what is of equal importance, serving as a rigid base for receiving the blow of the hammer, and insuring that sharp percussion of the detonating material without which its proper ignition is uncertain.

The importance of this rigid base will be best understood when it is remembered that in many fire-arms the flange or collar of the cartridge is struck at such an angle that the end of the barrel against which the collar bears is not in a position to receive the blow.

I claim as my invention and desire to secure by Letters Patent—

Packing the detonate in the collar of metallic cartridge-cases by means of a wad, *d*, which serves the twofold purpose of retaining the detonate within the collar and of a rigid medium for resisting the blow of the hammer.

In testimony whereof I have signed my name to this specification before two subscribing witnesses.

CHRISTIAN SHARPS.

Witnesses:

HENRY HOWSON,

D. B. BULLOCK.